Sept. 7, 1926.

W. P. VAN LAMMEREN 1,598,791

SPARE WHEEL AND LUGGAGE CARRIER FOR MOTOR CARS

Filed July 20, 1917

INVENTOR:
W. P. van Lammeren

ATTORNEY.

Patented Sept. 7, 1926.

1,598,791

UNITED STATES PATENT OFFICE.

WILLEM PETRUS van LAMMEREN, OF VOORBURG, NETHERLANDS, ASSIGNOR, BY MESNE ASSIGNMENTS, TO PACKARD MOTOR CAR COMPANY, OF DETROIT, MICHIGAN.

SPARE WHEEL AND LUGGAGE CARRIER FOR MOTOR CARS.

Application filed July 20, 1917, Serial No. 181,925, and in Germany February 3, 1917.

The modern development of motor car construction has led to the provision of luggage carriers at the rear of the cars.

This development has also led to the carrying of spare wheels (mostly two completely fitted wheels) on closed cars, and in such cases these wheels have usually been arranged at the rear of the car because this position is more suitable for carrying spare wheels than the sides of the car. The carrying of spare wheels at the sides of the car is not only apt to cause difficulty in opening the door, but there is also the danger of the spare wheels being knocked off since they project laterally. For this reason many of the cars in use are provided with spare wheel carriers at the rear.

The present invention has now for its object to provide an improved combined spare wheel and luggage carrier so arranged that when the luggage carrier is turned up out of the way (that is to say, when no luggage is carried), two spare wheels can be attached to the rear of the car, whilst when the luggage carrier is turned down for the purpose of carrying luggage, the two spare wheels can be attached on both sides of the car to the spare wheel carriers in such a manner that they form the sides of the luggage carrier without increasing the width of the car or causing any inconvenience in traffic.

The drawings illustrate by way of example a constructional form of carrier according to this invention.

Figure 2:
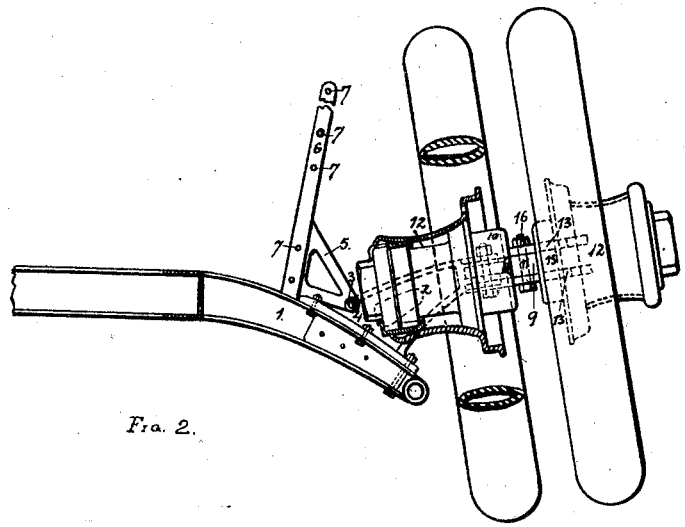
Figure 1:
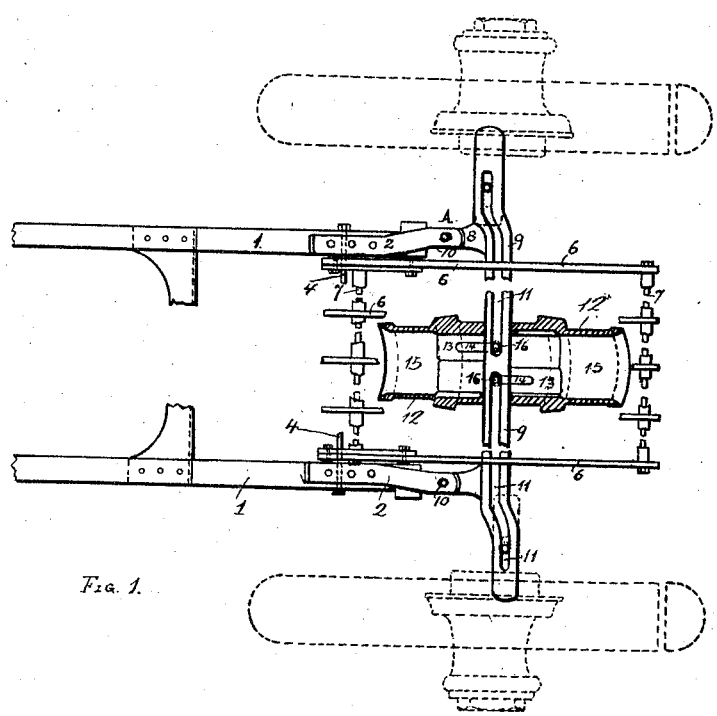

Fig. 1 is a plan view, partially in section, of the rear end of the vehicle frame, showing the normal position of the hubs in full lines, and the luggage carrying position of the spare wheels in dotted lines, and Fig. 2 is a side view, partially in section, of the device shown in Fig. 1, the spare wheels being shown in normal position.

The ends of the two side bars 1 of the frame are provided with brackets 2 fitted with eyes 3 in which a rod 4 is rotatably mounted. On this rod 4 there is fixed a frame 5, 6, 7, which constitutes the luggage carrier proper. This frame is shown in Fig. 2 in the position in which it is folded up against the rear of the car, and is consequently out of operation, whilst the frame is shown in the position of use in Fig. 1. The brackets 2 terminate in forks in which are fixed cross members 8 of a rod 9 by means of bolts 10. On removing one of these bolts 10, the rod 9 can be turned horizontally around the other bolt.

This rod 9 is formed with two slots 11 which project beyond the cross members 8. These slots are rounded at their inner ends as well as at their outer ends. On the rod 9 there are loosely mounted two hubs 12 each of which is adapted to carry a spare wheel. Each hub is provided with or carries a projecting cap 13 having upper and lower branches which are formed with slots 14, and has a hole 15. As shown, the caps 13 are arranged side by side, and each is formed to partly fit in a recess in the opposite hub. Then two bolts 16 can be passed through the slots 14 and 11, by means of which bolts the two hubs are fixed together as a whole on the rod 9. These bolts need not be screwed tight because the distance between the ends of the slots 11 in the middle of the rod 9 may be so chosen as not to allow the hubs to slide to and fro on the rod 9 when they are slid one into the other. This will also be the case if the bolts 16 should become slightly loose during travel.

When it is desired to use the luggage carrier, first one of the bolts 10 is removed, whereupon the spare wheel carrier can be swung outwards on the other bolt as a pivot in such a manner that the hubs can be slid towards both ends without having to be removed from the rod 9. In the example shown in the drawings this rotary movement takes place about the point A. The bolts 16 are loosened, and then whilst the bolts 16 slide in the slots 14 of the caps 13, the hubs can be slid apart towards the two ends of the rod 9, the bolts 16 sliding in the slots 11 of the rod 9. The outside loose hub can then pass by the pivot point A without having to be removed from the rod 9. The upper and lower branches of the cap 13 form a fork of sufficient depth to permit the inner hub to clear the projecting member 8 and to slide in its slot 11 to the outer end of the bar 9.

When the bolts 16 have reached the ends of the slots 11, the hubs can be rotated together with the wheels about the ends of the rod 9 until these ends are situated exactly in the holes 15 of the hubs. Then the hubs are slid back so far as the shape of the slots 11 will allow of the movement of the bolts 16, the ends of the rod 9 remaining in the holes 15. Finally, the bolts 16 are screwed up tight after the rod 9 has been turned back into its original position and fixed in the forks of the brackets 2. The hubs have now come into the position indicated in dotted lines in Fig. 1.

The luggage carrier can now be turned down into the position of use, the rod 9 being utilized as a support. The apparatus may be so constructed that in this position the spare wheels will form the sides of the luggage carrier, and in this position will not project sideways beyond the wheels of the car, so that the spare wheels do not increase the width of the car nor cause consequent inconveniences in traffic.

It is obvious that by altering the loose hubs the apparatus may be made adapted for use with single felloes or detachable rims with tires.

What I claim is:

1. A device of the character described, comprising a pair of brackets adapted to be mounted in spaced relation on a car and provided with terminal forks; a luggage carrier pivotally mounted in said brackets to swing between them into and out of horizontal position; a horizontal rod provided with a pair of spaced lateral arms having terminal engagement in the forks of said brackets, one arm being pivotally mounted for swinging movement in the corresponding fork, and the other arm being removably related to the other fork, said rod constituting a support on which said carrier is adapted to rest in horizontal position; and means on said rod for securing a spare-wheel thereon.

2. A combined spare-wheel and luggage-carrier for cars, comprising brackets adapted to be mounted on a car and having forks, a luggage-carrier pivotally mounted on said brackets, a horizontal rod having cross-members, and means for connecting said cross-members of the rod with the aforesaid forks of the brackets, said rod extending at both sides beyond the cross-members and having two slots formed therein, in combination with a spare-wheel carrier comprising a hub and a cap fitting therein and loosely connected with the horizontal rod to slide lengthwise thereof.

3. A combined spare-wheel and luggage-carrier for cars, comprising brackets adapted to be mounted on a car, a luggage-carrier pivotally mounted on the brackets, a horizontally-disposed rod supported by both said brackets and detachably connected with one of the latter, and two spare-wheel carriers both mounted on said rod and each slidable lengthwise thereof independently of the other.

4. A combined spare-wheel and luggage-carrier for cars, comprising brackets adapted to be mounted on a car, a luggage-carrier pivotally mounted on the brackets, a horizontally-disposed rod supported by both said brackets and a spare-wheel carrier mounted on said rod and slidable lengthwise thereof, to permit lowering of the luggage carrier.

5. In combination, with a car, a pivoted luggage-carrier at the rear of the car, a horizontally-disposed rod also at the rear of the car and constituting a support for the luggage-carrier when lowered, and a spare-wheel holder mounted on said rod and slidable lengthwise thereof out of the way of the luggage-carrier.

6. A device for carrying spare-wheels upon a car, said device consisting of a rod and of two hub-holding members on said rod and each slidable lengthwise and crosswise thereon so as to provide a luggage carrying space between spare wheels when they are separated.

7. In a carrier for demountable wheels, the combination with a vehicle frame, of a swinging bar extending beyond said frame and pivotally connected thereto at points intermediate its ends, a releasable connection between the bar and the frame, and means attached to the swinging member and projecting upon both sides thereof for securing demountable wheels on either side of said swinging member or at either end thereof.

8. In combination with a motor vehicle having side frame members, an accessory supporting device comprising brackets permanently secured to the frame members and having portions projecting longitudinally therefrom, a transverse bar, members associated with the bar intermediate the ends thereof pivotally connected to said portions, and means cooperating with the ends of the bar to support the accessory.

9. In combination with a motor vehicle having side frame members, a device for supporting an accessory comprising brackets permanently secured to the frame members, a transverse bar extending beyond the frame members and provided intermediate its ends with attaching members, means pivotally connecting the attaching members to said brackets, means connecting the accessories to said bar on either side of said attaching members.

10. The combination with a motor vehicle having side frame members, of an accessory support including brackets fixed to the side frame members, a transverse bar having members intermediate its ends pivotally connected to said brackets, and means to adjustably secure the accessories to the extremities of said bar beyond said frame members.

11. The combination with a motor vehicle having side frame members of accessory supporting means including a transverse bar, and means for attaching said bar to the vehicle including brackets fixed to the side frame members and having longitudinally projecting portions, members secured to the bar intermediate its ends and embraced by the said projecting portions, and bolts passing thru said members and said portions to provide a hinged joint therebetween.

In testimony whereof, I have signed my name to this specification.

WILLEM PETRUS van LAMMEREN.